Figure 1:
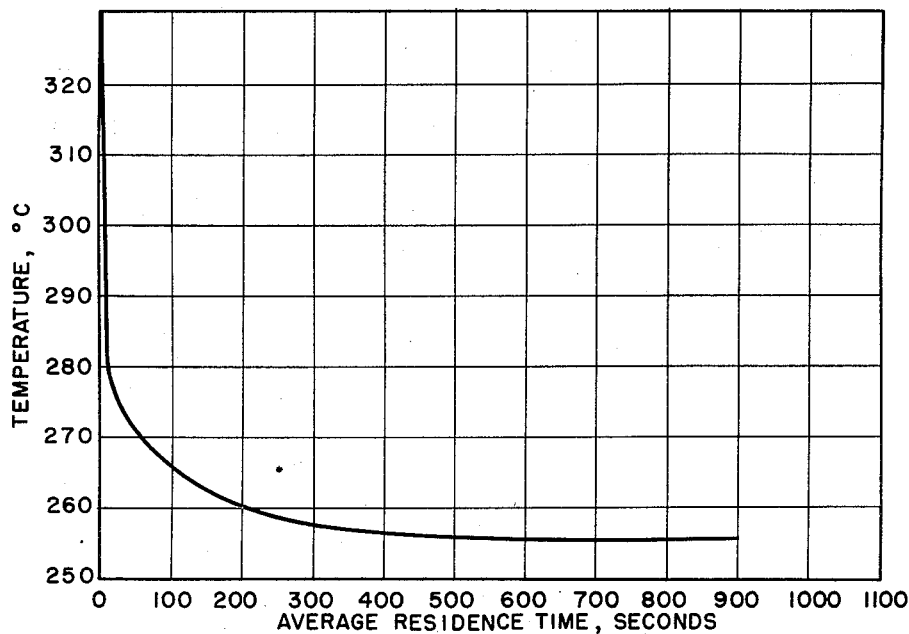

INVENTOR.
ALFRED STEITZ, JR.

United States Patent Office 2,920,096
Patented Jan. 5, 1960

2,920,096

PROCESS FOR EFFECTING PARTIAL OXIDATION OF HYDROCARBONS

Alfred Steitz, Jr., Tulsa, Okla., assignor to Pan American Petroleum Corporation, a corporation of Delaware Application March 26, 1956, Serial No. 573,825

5 Claims. (Cl. 260—451)

The present invention relates to a novel process for the partial oxidation of hydrocarbons. More particularly it is concerned with the partial vapor phase oxidation of hydrocarbons under conditions ideally suited to the procurement of high yields of chemicals.

In the partial oxidation of hydrocarbons satisfactory temperature control has always been a difficult problem. The reaction is highly exothermic and accordingly it is generally necessary to limit the extent of conversion (by controlling the amount of oxygen or hydrocarbon in the reactants) in order to maintain the temperature within the reaction zone at a reasonable level. The gaseous reactants are usually conducted into an elongated reaction zone of substantially uniform diameter under conditions such that the proper mixing of the relatively hot gaseous reaction products, which are moving toward the exit end of said zone, with the cooler feed gases does not occur to any appreciable extent. Failure to obtain suitable mixing of the hot product gases with the feed is undesirable for several reasons. Thus, if satisfactory mixing of hot product gas with cooler feed is not effected the selectivity of the oxidation reaction to more desirable chemicals is held to a relatively low level. Also, with elongated reaction zones formerly used in reactions of this type the temperature was difficult to control. This difficulty, as indicated above, appeared to be largely the result of improper mixing of reaction products with the feed.

In typical procedures employed in the past, for example see U.S. 2,128,908, temperatures of the order of 750° to 800° F. (400° to 427° C.) were used in combination with reactors having a high ratio of length to diameter. Contact times of not more than about three seconds were employed with a carbon selectivity to chemicals of about 40 mol percent being obtained.

Accordingly, it is an object of my invention to provide a process for the partial oxidation of hydrocarbons in which a maximum selectivity to chemicals is obtained. It is a further object of my invention to teach the effect of temperature and contact time of reactants in the reaction zone on the selectivity to desired chemicals. It is another object of my invention to secure the above results under conditions permitting accurate temperature control.

I have now discovered that high selectivity to chemicals can be secured by employing a reaction zone having a comparatively low length to diameter ratio, substantially lower temperatures than previously thought to be required and contact times appreciably greater than formerly considered feasible. In carrying out the process of my invention I may employ a reaction zone having a length to diameter ratio of from about 1:1 to about 5:1. In general I prefer to employ a reaction zone in which the volume thereof is large compared to the surface area of said zone, for example, a surface to volume ratio ranging from about 1:1 to about 3:1. The gaseous reaction mixture is preferably on the hydrocarbon rich side with the oxygen content thereof varying from about 4 to about 40 mol percent. Temperatures range from about 260° C. to about 300° C. Over this temperature range the contact time may vary from about 15 minutes at 260° C. to about 10 seconds at 300° C. Ordinarily, temperatures ranging from about 265° to about 275° C. are preferred at contact times of about 25 seconds and 125 seconds, respectively. Within these last mentioned ranges of temperature and contact times, I generally prefer oxygen concentrations in the feed of from about 15 to about 25 mol percent. Where lower concentrations of oxygen are desired, either within said last mentioned ranges of temperatures and contact times, or within the broader temperature and contact time ranges mentioned above, air or oxygen enriched air may be used as the oxidizing gas. The effect of pressure is apparently not significant except to increase yield from a given size reactor. In the majority of cases it is usually found expedient to operate at pressures ranging from about atmospheric to about 800 p.s.i.

Ordinarily I prefer to operate at the lowest possible temperature and corresponding residence or contact time required to maintain the reaction. Under such conditions I have found that highest carbon selectivity to chemicals is obtained. In other words, for any given residence time, highest yields of chemicals are obtained at the lowest temperature at which the reaction is sustained at said residence time. As the temperature is decreased, the relative molar amount of acids produced increases. For example, in oxidations effected in accordance with my invention and at a given contact time, 6.9 mol percent of acids were produced at 450° C. as compared to 12.8 mol percent at 272° C., under otherwise identical conditions.

In conjunction with such conditions a reaction zone having low length to diameter ratio is used. By employing a reaction chamber of this type the reaction temperature is readily controllable and the reactor can be operated at nearly isothermal conditions. This is for the reason that good mixing is obtained in a reactor of such design. Thus, the feed as it enters the reaction zone reacts and the products of reaction are immediately mixed with a large volume of previously formed products. In this way, although the temperature in the immediate zone in which the reaction occurs might be quite high, the volume of hot reaction products is so small when compared to the volume of the reactor itself that overall very little, if any, temperature change is experienced.

Carbon selectivity to chemicals is relatively constant as oxygen content of the feed is varied. However, the total yield of chemicals increases as the oxygen content of the feed is increased.

The effect of residence time on the minimum temperature at which the reaction results in high oxygen conversion is shown by the graph in Figure 1. The data on which the curve therein is based were obtained by subjecting a mixture of about 90 mol percent butane and 10 mol percent oxygen to non-catalytic reaction conditions in the vapor phase over the various temperatures and for the contact times indicated. The reactor employed had a surface to volume ratio of about 2:1. This curve shows the absolute minimum temperature at which the reaction under the conditions of my invention can be sustained at a given contact or residence time. At any given residence time, however, substantially equally good results can be expected at temperatures approximately 20° C. above the temperature indicated on the curve at said given contact time. For example, one can expect to secure substantially the same oxygen conversions at a temperature of 290° C. and at a contact time of about 50 seconds as are obtained at the same contact time at a temperature of about 270° C.

With increasing amounts of oxygen in the feed gas the minimum temperature at which reaction will be sustained at a given contact time increases only slightly. Within the temperature range of 260° to 300° C. taught herein the contact time required to obtain maximum selectivity to chemicals can be determined from the following equation which defines the curve in Figure 1:

$$\text{Residence time} = \frac{877.6}{T-255} - 9.54$$

wherein T represents the temperature within the aforesaid range at which it is desired to operate. In other words, by substituting for T in the above equation the operating temperature to be employed, the proper contact time at such temperature can be established and the result obtained, when plotted in terms of temperature vs. residence time, will fall on or substantially on the curve in Figure 1. As pointed out above the contact time determined in this manner will be found generally satisfactory for both temperatures falling on the curve in Figure 1 at such contact time as well as temperatures about 20° higher (but not above about 300° C.) at the same contact time.

Figure 2:
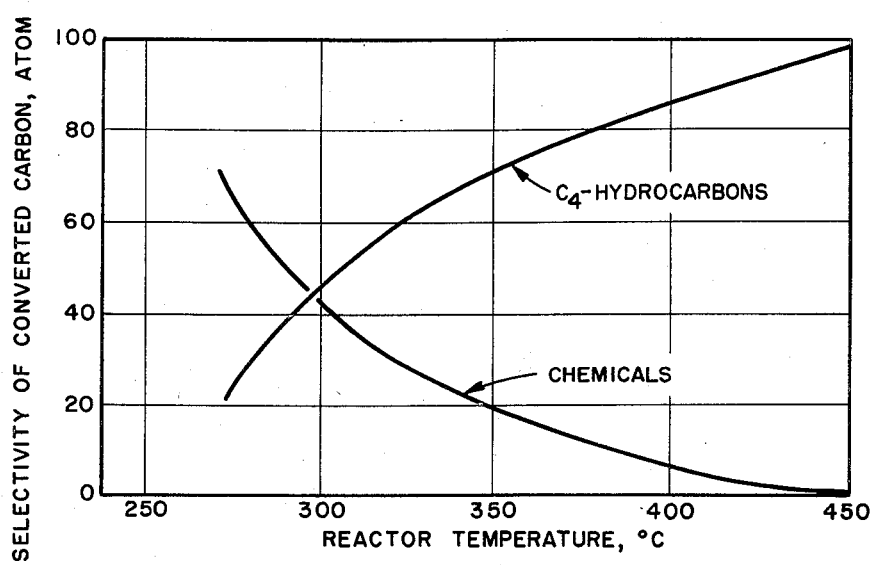

Figure 2 is a plot showing the effect of temperature on carbon selectivity to chemicals and to hydrocarbons at a substantially fixed contact time and a fixed amount of oxygen in the feed. In the runs on which these curves are based, a butane rich stream containing 4 mol percent oxygen was used as feed. The reactor surface to volume ratio was about 2:1 and the contact time was maintained within the range of 31 to 42 seconds. The runs were carried out at atmospheric pressure at temperatures ranging from about 270° to about 450° C. It is apparent that carbon selectivity to chemicals decreases rapidly with increasing temperatures while selectivity to hydrocarbons increases at a substantially corresponding rate.

While the process of my invention is applicable to light hydrocarbons in general such as for example saturated and unsaturated hydrocarbons having from about two to about five carbon atoms, it is particularly suitable to the production of chemicals in high yields from propane and butane.

My invention is further illustrated by reference to the following specific example.

EXAMPLE

In the runs employed to obtain the data appearing below a reactor having a surface to volume ratio of 1.94 was used. The conditions employed and the results secured are set forth in the following table.

Table

| Run No | I | II | III | IV |
|---|---|---|---|---|
| Operating conditions: | | | | |
| Temperature, °C | 262±2 | 300 | 292 | 272 |
| Contact time, sec | 770 | 39.0 | 40.5 | 41.9 |
| Mol percent $O_2$ in feed | 25.5 | 3.84 | 5.05 | 5.05 |
| Feed rates, g. mol/hr.: | | | | |
| Oxygen | 0.0132 | 0.0312 | 0.0967 | 0.0967 |
| Butane | 0.0384 | 0.7820 | 1.8165 | 1.8165 |
| Chemicals, g. eq./hr.: | | | | |
| Acids | 0.0016 | 0.0007 | 0.0049 | 0.0091 |
| Alcohols | 0.0032 | 0.0087 | 0.0295 | 0.0229 |
| Carbonyls | 0.0032 | 0.0217 | 0.0487 | 0.0392 |
| Total | 0.0080 | 0.0311 | 0.0831 | 0.0712 |
| Conversion, Percent: | | | | |
| Butane | 13 | 4.01 | 3.2 | 2.2 |
| Oxygen | 99 | 100 | 99.6 | 82.5 |
| Selectivity of converted oxygen, atom Percent: | | | | |
| Carbon monoxide | 22 | 17.2 | 10.5 | 9.6 |
| Carbon dioxide | 10 | 0 | 4.3 | 5.7 |
| Water | 26 | 33.0 | 39.9 | 34.8 |
| Chemicals | 42 | 49.8 | 45.3 | 49.9 |
| Total | 100 | 100.0 | 100.0 | 100.0 |

Table—(Continued)

| Run No | I | II | III | IV |
|---|---|---|---|---|
| Selectivity of converted butane, carbon atoms percent: | | | | |
| Carbon monoxide | 26 | 8.5 | 8.7 | 9.7 |
| Carbon dioxide | 6 | 0 | 1.8 | 2.9 |
| $C_1$–$C_3$ sat. HC | 2 | 16.8 | 11.4 | 1.6 |
| $C_2$–$C_4$ unsat. HC | 5 | 37.4 | 21.9 | 10.5 |
| Chemicals | 61 | 37.3 | 56.2 | 75.3 |
| Total | 100 | 100.0 | 100.0 | 100.0 |

From the foregoing description and example the advantages of employing the combination of conditions taught herein to secure maximum selectivity to chemicals by the vapor phase partial oxidation of light hydrocarbons are believed to be evident. Within the ranges of such conditions as temperatures and contact times disclosed herein the desirable contact time for any temperature to obtain maximum yields of chemicals in accordance with my invention may be readily determined.

I claim:

1. In a process for the production of oxygenated organic chemicals by the vapor phase non-catalytic partial oxidation of a hydrocarbon having not more than five carbon atoms, the improvement which comprises introducing a mixture of a free oxygen-containing gas and said hydrocarbon into a reaction zone having a surface to volume ratio ranging from about 1:1 to about 5:1, wherein reaction between the oxygen and said hydrocarbon occurs at a temperature ranging from about 260° to about 300° C.; and mixing immediately in said zone, under isothermal conditions, the resulting products of said reaction with a large volume of previously formed products from said partial oxidation in said zone, the contact time employed in carrying out said reaction being determined by the following equation:

$$\text{Contact time, seconds} = \frac{877.6}{T-255} - 9.54$$

wherein T represents a temperature within the aforesaid range, the relationship of said contact time to said temperature being such that any combination of said contact time and temperature as determined by said equation defines a point falling substantially on the curve in Figure 1, oxygen being present in said zone in a concentration ranging from about 4 to about 40 mol percent.

2. The process of claim 1 in which the light hydrocarbon employed is a member selected from the group consisting of propane and butane.

3. The process of claim 1 in which the reaction zone employed has a surface to volume ratio ranging from 1:1 to 3:1.

4. The process of claim 1 in which the reaction temperature employed ranges from about 265° to about 275° C., the contact time ranges from about 25 seconds to about 125 seconds and the oxygen content of the reaction mixture ranges from about 15 to about 25 mol percent.

5. The process of claim 4 in which the hydrocarbon employed is a normally gaseous saturated hydrocarbon having from two to five carbon atoms.

References Cited in the file of this patent

UNITED STATES PATENTS

| 1,911,746 | Burke et al. | May 30, 1933 |
| 1,978,621 | Burke | Oct. 30, 1934 |
| 2,007,115 | Walker | July 2, 1935 |
| 2,190,453 | King et al. | Feb. 13, 1940 |
| 2,770,637 | Mitchell et al. | Nov. 13, 1956 |
| 2,809,981 | Kittleson et al. | Oct. 15, 1957 |